United States Patent [19]

Sumimoto et al.

[11] 4,240,183
[45] Dec. 23, 1980

[54] FASTENER

[75] Inventors: Yasukichi Sumimoto, Tokyo; Masami Kato, Nagoya, both of Japan

[73] Assignees: Toska Co., Ltd.; Japan Bano'k Co., Ltd., both of Tokyo, Japan

[21] Appl. No.: 817

[22] Filed: Jan. 4, 1979

[30] Foreign Application Priority Data

Feb. 17, 1978 [JP] Japan .............................. 53/19403[U]
Mar. 17, 1978 [JP] Japan ................................ 53/29846
Jul. 31, 1978 [JP] Japan ......................... 53/105352[U]

[51] Int. Cl.³ ............................................. B65D 63/00
[52] U.S. Cl. ............................... 24/16 PB; 24/30.5 P; 24/206 A; 248/221.4; 292/319
[58] Field of Search .............. 24/16 R, 16 PB, 30.5 P, 24/17 AP, 206 A; 292/319, 320, 321, 322; 248/221.4

[56] References Cited

U.S. PATENT DOCUMENTS

| 555,412 | 2/1896 | Tuson | 292/320 |
|---|---|---|---|
| 1,974,499 | 9/1934 | Luce | 24/16 PB |
| 3,078,064 | 2/1963 | Turnbull | 248/221.4 |
| 3,149,869 | 9/1964 | Chamberlin | 292/320 |
| 3,422,499 | 1/1969 | Merser | 24/16 PB |
| 3,462,802 | 8/1969 | Merser | 24/16 PB |
| 3,466,077 | 9/1969 | Moberg | 24/30.5 P |
| 3,597,803 | 8/1971 | Van Neil | 24/16 PB |
| 3,712,655 | 1/1973 | Fuehrer | 24/16 PB |
| 3,816,879 | 6/1974 | Merser et al. | 24/16 PB |
| 3,931,667 | 1/1976 | Merser et al. | 292/322 |
| 4,001,919 | 1/1977 | Moberg et al. | 24/16 PB |
| 4,059,300 | 11/1977 | Moberg et al. | 24/16 PB |
| 4,093,288 | 6/1978 | Suzuki | 24/16 PB |

Primary Examiner—Victor N. Sakran
Attorney, Agent, or Firm—Armstrong, Nikaido, Marmelstein & Kubovcik

[57] ABSTRACT

A fastener device is disclosed, which comprises an inserting part, a socket having an insertion aperture and an intermediate filament connecting the inserting part and the socket. The inserting part, which can be inserted into the socket from either of two insertion directions of the aperture, has at least one tongue, which has a suitable elasticity and can expand in radial directions relative to the axis of the inserting part under its condition free of any force application. The aperture of the socket has a face to engage and stop the socket, which is vertically provided relative to the axis of the aperture. In inserting the inserting part into the socket, the tongue undergoes contraction to facilitate its passage through the aperture, and when it has been completely passed through the aperture, the tongue restores its original condition and radially expands to abut against the engaging face of the aperture, preventing the inserting portion from being pulled out of the socket. This fastener device is formed from a synthetic resin in an integral structure.

26 Claims, 42 Drawing Figures

FASTENER

BACKGROUND OF THE INVENTION (1) Field of the Invention

The present invention relates to a fastener comprising a socket having an insertion aperture, an intermediate filament and an inserting part, in which the inserting part can be inserted into the aperture from any direction and anchored to the socket very tightly.

The fastener of the present invention has a good elasticity and it preferably is integrally formed from a synthetic resin such as nylon and polypropylene. This fastener is used for attaching a tag or label indicating the quality or price to an article, sealing the lid or closure of various meters or the like, connecting and holding at least two articles such as slippers or sandals or closing a mouth of a bag or the like.

(2) Description of the Prior Art

In conventional fasteners of this type, an inserting part is inserted into an aperture formed on a socket only from one predetermined direction, and the inserting part is anchored to the socket. When a tag or the like is attached to an article by using such fastener, a worker should confirm in advance the direction of bending the fastener or filament in a loopy form or the direction of inserting the inserting part into the aperture of the socket according to the application position or purpose of the fastener. When it is intended to insert the inserting part into the aperture from a direction reverse to the predetermined insertion direction, it is impossible to fasten and anchor the inserting part onto the socket. Accordingly, the fastening operation is troublesome and the operation efficiency is low.

As means for eliminating these disadvantages, U.S. Pat. No. 3,816,879 proposes a fastener in which an inserting part can be inserted from any of both the directions into an aperture formed in a socket to facilitate the operation of fastening a tag or the like. This fastener comprises a socket, a filament and an inserting part, wherein one or two locking vanes longitudinally extending and laterally deflectable are formed in an aperture of the socket and an interior edge is formed in the rear of the tip of the inserting part. When the tip is inserted into the aperture, the locking vane is laterally deflected and expanded. When the tip has passed through the vane, the locking vane returns to its original state and the interior edge of the tip butts against the edge of the vane, whereby the inserting part is prevented from falling out from the socket. The inserting part may be inserted into either of the two inlets of the aperture. In this fastener, the vane is formed on the inside of the socket having a small cylindrical shape, and therefore, molding or preparation of this fastener is very difficult. Further, since a large-size socket can hardly be prepared because of the complicated structure, it is very difficult to obtain a fastener suitably applicable to the above-mentioned uses. Still further, when the inserting part is anchored in the aperture, a clearance is formed between the inserting part and the inserting part, and therefore, the aperture moves or shakes in the aperture and cannot be tightly fixed in the socket. Accordingly, there is a risk of falling-out of the inserting part from the socket.

SUMMARY OF THE INVENTION

The fastener of the present invention comprises a socket having an insertion aperture, a filament and an inserting part to be inserted and anchored in the aperture, wherein the inserting part can be inserted from any direction into the aperture, at least one tongue having an appropriate elasticity, which can expand in the radial direction with respect to the axis of the inserting part without any force being imposed on the inserting part when the inserting part is inserted into the aperture, is formed on the inserting part, and an anchoring face is formed on the aperture of the socket in the vertical direction to the axis of the aperture so that the tongue abuts against or engages with the anchoring face. When the inserting part is inserted into the aperture of the socket, the tongue is contracted and allowed to pass through the aperture. When the tongue has completely passed through the aperture, the tongue restores to its original state and expands, and it abuts against the abutting face. Accordingly, even if the inserting part is pulled in a direction reverse to the insertion direction, it can not fall out of the socket.

It is therefore a primary object of the present invention to provide a fastener in which an inserting part can be inserted into an aperture formed on a socket from any direction to anchor the inserting part tightly to the socket and the fastening operation can be performed very easily and promptly without application of any particular force.

Another object of the present invention is to provide a fastener in which the structure of a socket or inserting part is very simple and the size is small and hence, mass production is possible at low costs.

Still another object of the present invention is to provide a fastener, in which the force of binding an inserting part to a socket is so strong that the once anchored inserting part can hardly be separated from the socket.

These and other objects, features and advantages of the present invention will be apparent from the following description taken in connection with the accompanying drawings.

BRIEF DESCRIPTION OF THE DRAWINGS

FIGS. 3 to 8 illustrate a fastener according to the first embodiment of the present invention, in which

FIGS. 9 to 13 illustrate a fastener according to the second embodiment of the present invention, in which

FIGS. 14 and 15 illustrate a fastener according to the third embodiment of the present invention, in which

FIGS. 16 to 19 illustrate a fastener according to the fourth embodiment of the present invention, in which

FIGS. 20 to 22 illustrate a fastener according to the fifth embodiment of the present invention, in which

FIGS. 23 to 26 illustrate an inserting part of a fastener according to the first modification of the present invention, in which

FIGS. 27 to 31 illustrate a fastener according to the second modification of the present invention, in which

FIGS. 32 and 33 illustrate a fastener according to the third modification according to the present invention, in which

FIGS. 35 to 41 illustrate a fastener according to the fifth modification of the present invention, in which

DETAILED DESCRIPTION OF THE PREFERRED EMBODIMENTS

Figure 1:
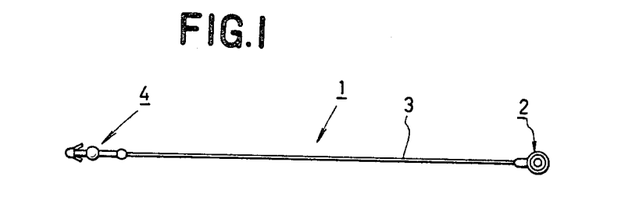
FIG. 1 is a plan view showing the entire structure of the fastener of the present invention in a reduced scale.
Figure 2:
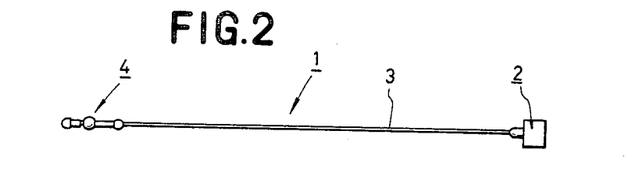
FIG. 2 is a front view of the fastener of FIG. 1.

Referring to FIGS. 1 and 2, the fastener 1 of the present invention generally comprises a socket 2, an intermediate filament 3 and an inserting part 4, and it preferably is integrally and elastically formed from a synthetic resin, the strength of which is increased by stretching, such as nylon or polypropylene. The fastener 1 is formed in a mold in such state that the filament is thick and short, but ordinarily, the filament is stretched by the mold per se or other drawing means to form a thin and long filament. In the stretched filament, the strength and elasticity are increased, and therefore, the material cost can be recuced. When an article to be fastened or bound by the fastener is small in the size or a high binding strength is not particularly required, the filament may be used as it is formed in the mold and is not stretched.

EMBODIMENT 1

Figure 3:
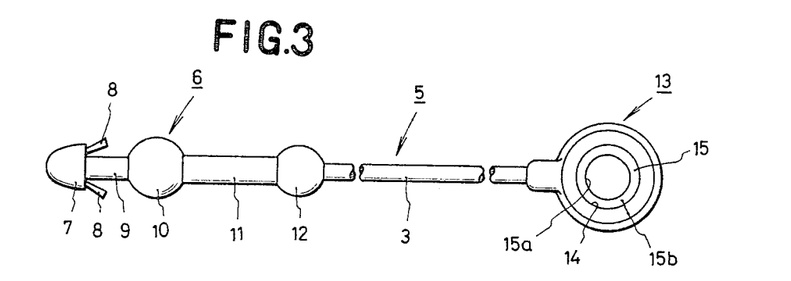
FIG. 3 is a plan view of the fastener.
Figure 4:
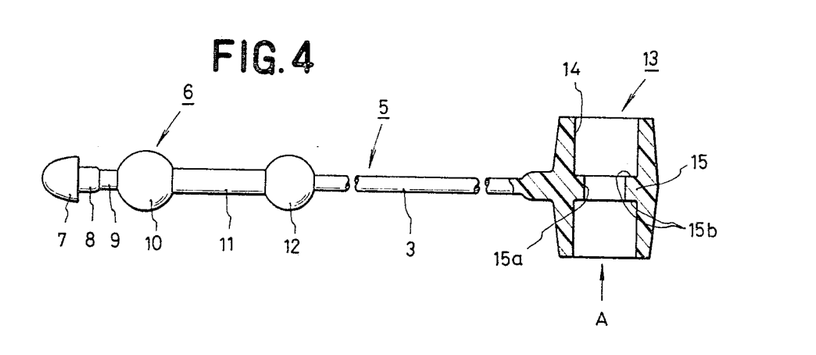
FIG. 4 is a front view of the fastener of FIG. 3 showing the section of a socket.

The fastener according to the first embodiment of the present invention is illustrate in FIGS. 3 to 8. Referring to FIGS. 3 and 4, an inserting part 6 of the fastener 5 comprises an enlarged head 7 at the top end, two tongues 8, a first connecting portion 9, a stop 10, a second connecting portion 11 and a hold 12. An insertion aperture 14 extending in a direction perpendicular to the axial direction of the filament 3 is formed on a socket 13, and an inner flange 15 is formed in the central portion of the aperture 14. This flange 15 has a gujide face 15a having the same axis as that of the aperture 14 and two engaging or abutting faces 15b having the axis vertical to the axis of the aperture 14. It is preferred that the socket 13 be formed so that it includes the axis of the filament 3 and it is symmetric with respect to the plane perpendicular to the axis thereof. The head 7 at the top end of the inserting part 6 is substantially conical, and the maximum diameter thereof is smaller than the inner diameter of the guide face 15a, whereby insertion of the inserting part 6 into the aperture 14 and the guide face 15a is facilitated. The two tongues 8 are rooted to the rear end face of the head 7. The free end of each tongue expands when no force is imposed, and the distance between the two free ends is larger than the inner diameter of the guide face 15a. The tongues 8 have an appropriate elasticity. The sum of the thickness of the two tongues and the diameter of the first connection portion 9 is smaller than the inner diameter of the guide face 15a. The stop 10 preferably is formed to have a substantially spherical shape, and the diameter is smaller than the inner diameter of the aperture 14 but larger than the inner diameter of the guide face 15a. It is preferred that the hold 12 be formed to have a substantially spherical shape. Of course, the shape of the stop 10 or hold 12 is not limited to a spherical shape.

The functions of the respective elements of the fastener of this embodiment will now be described.

Figures 5, 6:
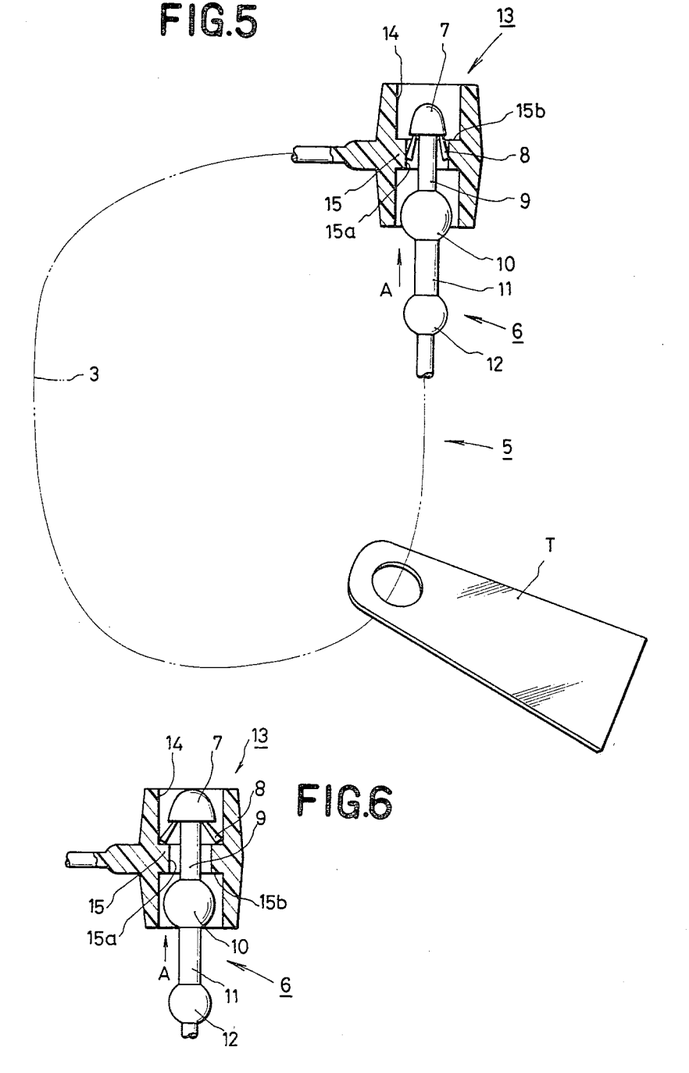
FIG. 5 is a view showing the state of the fastener where an inserting part is being inserted into the socket, the socket being shown in the section and a tag being shown in the perspective.
FIG. 6 is a partial sectional view illustrating the state where the inserting part is anchored to the socket.
Figure 7:
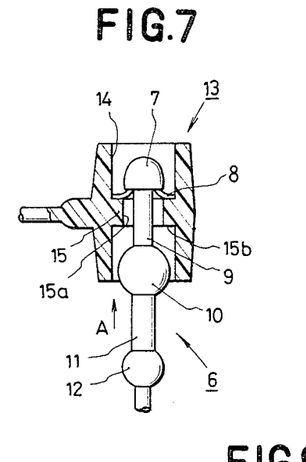
FIG. 7 is a partial sectional view, similar to FIG. 6, illustrating the state where the inserting part anchored to the socket is pulled by a large force.
Figure 8:
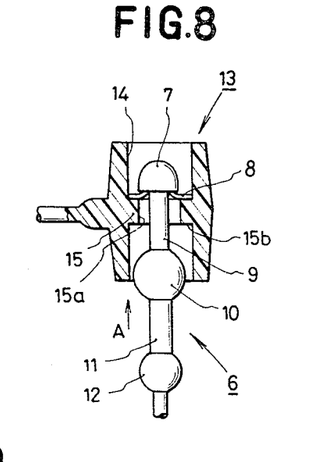
FIG. 8 is a partial sectional view, similar to FIG. 6, illustrating the state where the inserting part anchored to the socket is pulled by a very large force.

For example, as shown in FIG. 5, the inserting part 6 is passed through a hole of a tag T, and the filament 3 is curved and wound around an article. Alternately, the inserting part 6 is pierced through an article or a package of the article and passed through the hole of the tag T. Then, the head 7 is inserted into the guide face 15a from one side of the aperture 14 of the socket 13 (for example, in a direction of arrow A). When the tongues 8 are introduced into the guide face 15a, they are elastically bent toward the inside. When the free ends of the tongues 8 have completely passed through the guide face 15a, the tongues 8 restore the original stage as shown in FIG. 6, and the distance between both the free ends of the tongues 8 becomes larger than the diameter of the guide face 15a. When the inserting part 6 is further inserted in the direction of arrow A, the stop 10 butts against the end edge defined by the guide face 15a and the abutting face 15b. Accordingly, further insertion of the inserting part 6 is prevented. Thus, the operation of anchoring the inserting part 6 to the socket 13 is completed. When a pulling force is imposed on the inserting part in a direction reverse to the insertion direction (namely, a direction reverse to the direction of arrow A), if the pulling force is small, the tongues 8 are caused to abut against the abutting face 15b, and the inserting part 6 is prevented from falling out from the socket 13. If the imposed pulling force is considerably large or very large, as shown in FIG. 7 or 8, the tongues 8 are bent to abut against the abutting face 15b and the inserting part 6 is not allowed to fall out from the socket 13. Accordingly, the inserting part 6 cannot be pulled out from the socket 13 unless the tongues 8, the inserting part 6, the socket 13 or other parts are broken. Therefore, the binding force obtainable in this fastener is considerably large.

From FIGS. 5 to 8, it will readily be understood that the inserting part 6 can similarly be inserted into the aperture in a direction reverse to the above direction, namely a direction reverse to the direction of arrow A.

EMBODIMENT 2

Figure 9:
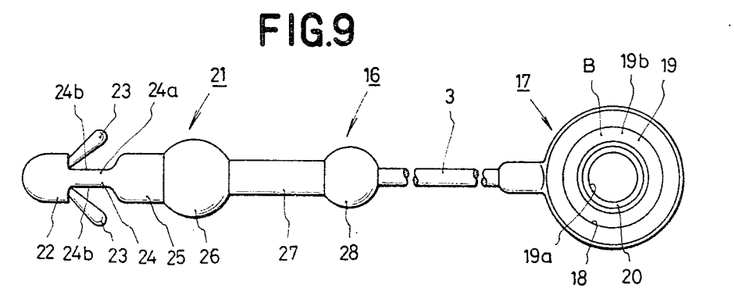
FIG. 9 is a plan view of the fastener.
Figure 10:
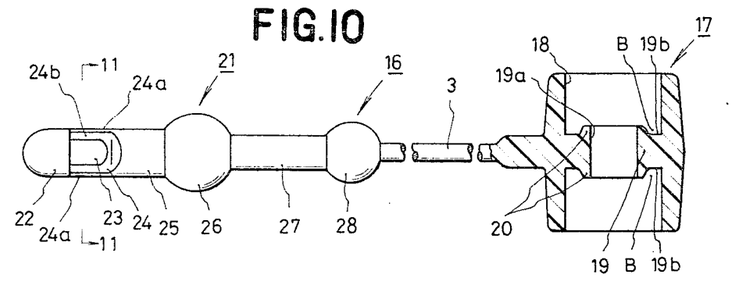
FIG. 10 is a front view of the fastener of FIG. 9 showing the section of a socket.
Figures 11, 12, 13, 14, 15:
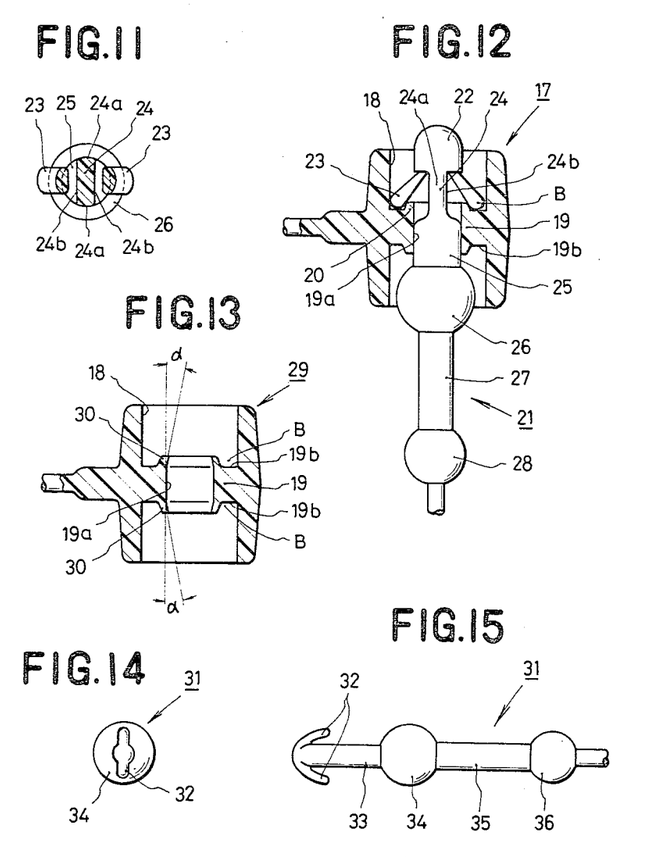
FIG. 11 is a view showing the section of an inserting part taken along line 11 in FIG. 10.
FIG. 12 is a partial sectional view showing the state where the inserting part is anchored to the socket.
FIG. 13 is a sectional view showing a partial modification of the socket shown in FIG. 10.
FIG. 14 is a left side view of FIG. 15
FIG. 15 is a front view of an inserting part.

A fastener 16 according to the second embodiment is illustrated in FIGS. 9 to 13. Referring to FIGS. 9 to 11, an aperture 18 is formed on the inside of a socket 17, and an inner flange 19 having a guide face 19a, and abutting faces 19b is formed in the central portion of the circumferential face of the aperture 18. An annular projection 20 extending in the axial direction of the aperture 18 is formed on each of the abutting faces 19b. The inner circumferential face of the projection 20 has the same diameter as that of the guide face 19a and is on the same plane as the guide face 19a. Spaces B are defined by the outer circumferential face of the projection 20 with the abutting face 19b and the inner circumferential face of the aperture 18, respectively. An inserting part 21 comprises an enlarged head 22, two tongues 23, a first connecting portion 24, a cylindrical portion 25, a stop 26, a second connecting portion 27 and a hold 28. The first connecting portion includes cylindrical faces 24a and flat faces 24b, and the cylindrical faces 24a and cylindrical portion 25 are to be fitted to the guide face 25a. The tongues 23 are rooted to the rear end face of the head 22 and have an appropriate elasticity. When no external force is applied to the tongues 23, the distance between the free ends of the tongues 23 is equal to the diameter of the space B of the socket 17. The thickness of each tongue 23 is small at the root portion and gradually greater toward the free end.

When the inserting part 21 is inserted and anchored in the socket 17, the free ends of the tongues 23 are contained in the space B as shown in FIG. 12. Accordingly, the free ends of the tongues 23 are tightly held in the space B and are prevented from falling out therefrom. Since tongues 23 are reduced in their thickness about their root portions, they can with ease flex in contracting directions when they are inserted along the guide face 19a, whereby the insertion of tongues 23 into socket 17 can be facilitated. Further, the tongue 23 has an increased thickness at its free end portion, so that in its condition in which its end is received within the cavity B, the strength can be increased of the fastener structure against a force of pulling the inserting part 21 out of the socket 17. Further, since the cylindrical faces 24a and the cylindrical portion 25 are fitted in the guide face 19a and are not allowed to move in the lateral direction, the inserting part 21 is anchored to the socket 17 more assuredly than in the first embodiment illustrated in FIGS. 3 to 8. After the inserting part 21 has been anchored to the socket 17, it hardly causes any shaking movement to the socket 17.

Annular projections 30 formed in the interior of the socket 29 may be arranged so that the inner face of each projection 30 has an angle of $\alpha$ to the guide face 19a as shown in FIG. 13. When this arrangement is adopted, the cylindrical portion 25 is elastically held by the annular projections and the shaking movement of the inserting part to the socket can be prevented more effectively. It is preferred that the angle $\alpha$ of each annular projection be about 10°.

EMBODIMENT 3

An inserting part 31 of the fastener according to the third embodiment of the present invention is shown in FIGS. 14 and 15. Two tongues 32 are formed just in the rear of the top end of the inserting part 31 so that these tongues 32 constitute a part of the top end portion, and in this embodiment, the enlarged head 7 as shown in FIGS. 3 and 4 is not formed. The inserting part 31 further includes a first connecting portion 33, a stop 34, a second connecting portion 35 and a hold 36. The structure of this inserting part 31 is very simple, and therefore, it can be molded very easily. Further, when this inserting part 31 is anchored to the socket, a very large binding force can be attained.

EMBODIMENT 4

Figure 16:
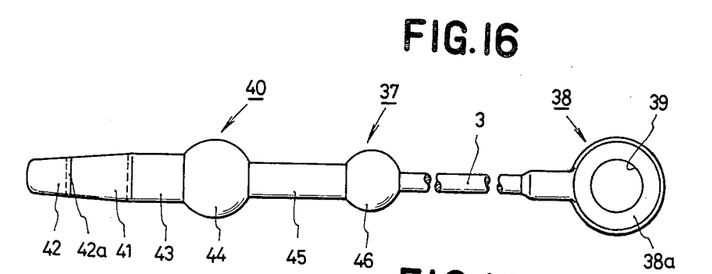
FIG. 16 is a plan view of the fastener.
Figure 17:
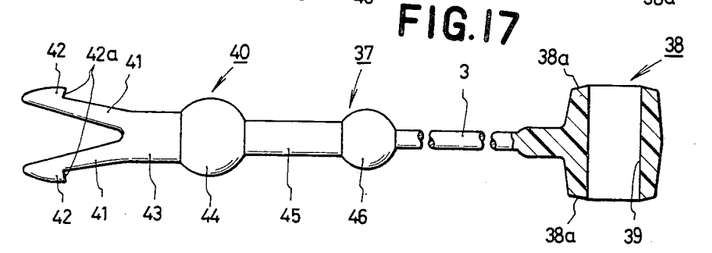
FIG. 17 is a front view of the fastener of FIG. 16 illustrating the section of a socket.

A fastener 37 according to the fourth embodiment of the present invention is illustrated in FIGS. 16 to 19. Referring to FIGS. 16 and 17, an aperture 39 is formed on a socket 38, and preferably, both the end faces 38a of the socket 38 are inclined. The top end of an inserting part 40 is formed to have a bifurcate shape including two prongs or tines 41. In the free state, these prongs 41 are expanded and the distance between the tips of the prongs is larger than the diameter of the aperture 39. Each of the prongs 41 has an appropriate elasticity. Flukes 42 are formed on the outsides of the tips of the prongs 41, respectively, and the inclination of the longitudinal faces 42a of the flukes 43 corresponds to the inclination of the end faces 38a of the socket 38. In the rear of the prongs 41, there are formed in succession a cylindrical portion 43, a stop 44, a connecting portion 45 and a hold 46. The cylindrical portion 43 is to be fitted in the aperture 39.

The functions of the respective elements in this embodiment will now be described.

Figure 18:
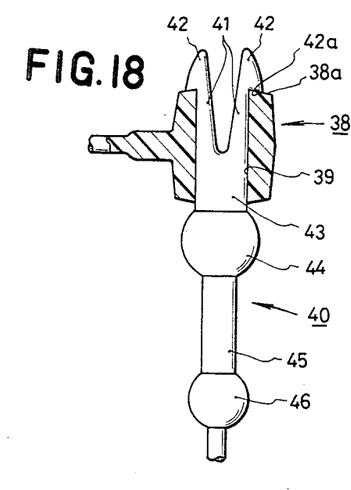
FIG. 18 is a partial sectional view illustrating the state where an inserting part is anchored to the socket.

When the inserting part 40 is inserted into the aperture 39 from the top end portion of the part 40, the distance between both the prongs 41 are contracted and therefore, they are allowed to pass through the aperture 39. When the longitudinal faces 42a of the flukes 42 of the prongs 41 have completely passed through the aperture 39, the prongs 41 are expanded again because of their elasticity. Accordingly, even if the inserted inserting part 40 is pulled in a direction reverse to the insertion direction, as shown in FIG. 18, the longitudinal faces 42a are tightly anchored on the end faces 38a of the socket 38 and the inserting part 40 is prevented from falling out from the socket 38. Accordingly, the inserting part cannot be separated from the socket 38. The inclinations formed on the longitudinal faces 42a and end faces 38a enhance prevention of falling-out of the inserting part 40 from the socket 38. The cylindrical portion 43 is fitted in the inner circumferential face of the aperture 39, and shaking of the inserting part 40 in the aperture 39 is prevented. The fastener 37 having such socket 38 and inserting part 40 has a very simple structure and it can be molded very easily.

Figure 19:
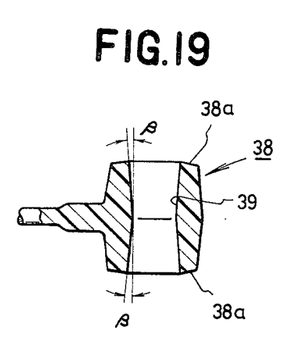
FIG. 19 is a sectional view showing a partial modification of the socket shown in FIGS. 16 and 17.

The inner face of the aperture 39 may be inclined from the central portion toward both the end faces at an angle of $\beta$. In this case, insertion of the inserting part 40 into the aperture 39 can be remarkably facilitated.

EMBODIMENT 5

Figure 20:
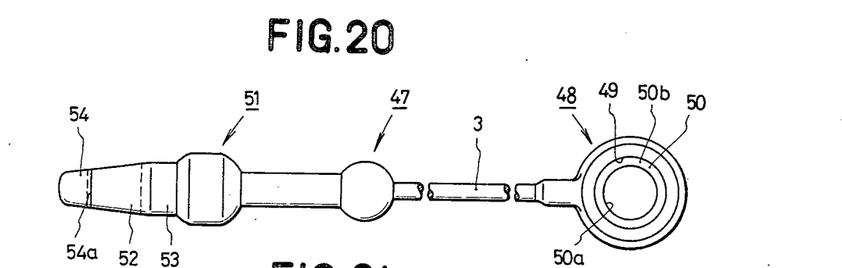
FIG. 20 is a plan view of the fastener.
Figure 21:
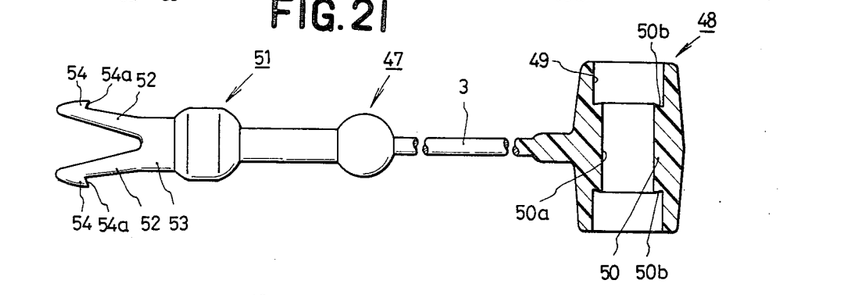
FIG. 21 is a front view of the fastener of FIG. 20 illustrating the section of a socket.
Figure 22:
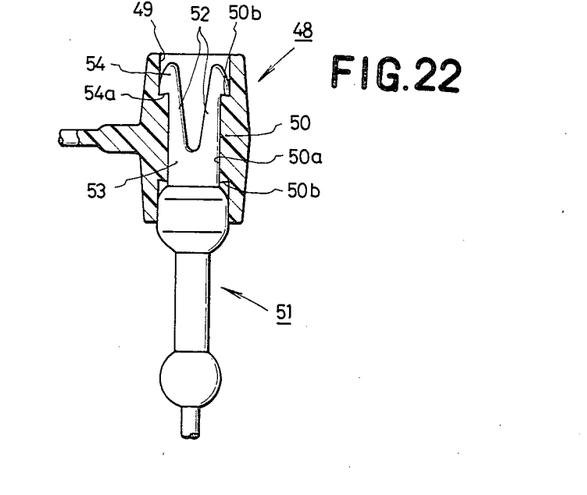
FIG. 22 is a partial sectional view illustrating the state where an inserting part is anchored to the socket.

A fifth embodiment of the fastener is illustrated in FIGS. 20 to 22. Referring to FIGS. 20 and 21, an inner flange 50 having a guide face 50a and abutting faces 50b is formed in the central portion of an aperture 49 of a socket 48 of a fastener 47. An inserting part 51 has two prongs 52 in the top end portion thereof, and the distance between the tips of the prongs 52 in the free state is larger than the inner diameter of the guide face 50a but smaller than the inner diameter of the aperture 49. The outer diameter of a cylindrical portion 53 in the rear of the prongs 52 is made equal to the inner diameter of the guide face 50a. When the inserting part 51 is inserted into the aperture 49, as shown in FIG. 22, longitudinal faces 54a of flukes 54 of the prongs 52 are caused to abut against the abutting faces 50b, whereby the inserting part 51 is anchored to the socket 48. At this point, the flukes 54 are contained in the interior of the aperture 49, and therefore, the risk of falling-out of the inserting part 51 from the socket 48 in the fastener of the present embodiment by mischief or the like can be reduced as compared with the fastener 37 shown in FIGS. 16 to 18. Further, since the cylindrical portion 53 of the inserting part 51 is fitted in the guide face 50a, shaking of the inserting part 51 in the interior of the guide face 50a is effectively prevented.

Various modifications described below may be made to the fasteners of the above-mentioned embodiments 1 to 5.

MODIFICATION 1

Figure 23:
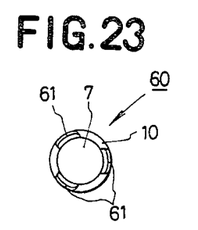
FIG. 23 is a left side view of FIG. 24.
Figure 24:
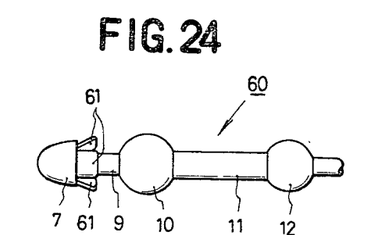
FIG. 24 is a front view of an inserting part having three tongues.
Figure 25:
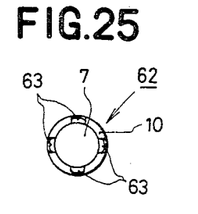
FIG. 25 is a left side view of FIG. 26.
Figure 26:
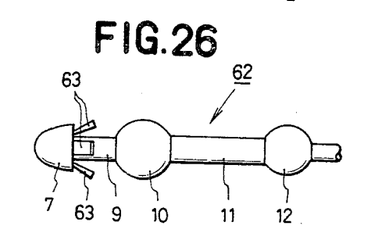
FIG. 26 is a front view of an inserting part having four tongues.

In the fastener of embodiment 1 (see FIGS. 3 and 4), the inserting part 6 has two tongues 8. The number of the tongues 8, however, is not limited to 2. For example, as shown in FIGS. 23 and 24, the inserting part 60 may have three tongues 61, and as shown in FIGS. 25 and 26, the inserting part 62 may have four tongues 63. Further, only one tongue may be formed on the inserting part. When one or two tongues are formed, the inserting part can easily be molded, and when two tongues are formed, the binding force is larger than in the case where only one tongue is formed.

This modification 1 may similarly be applied to the tongues of embodiment 2 (see FIGS. 9 to 11) and embodiment 3 (see FIGS. 14 and 15) and to the prongs of embodiment 4 (see FIGS. 16 and 17) and embodiment 5 (see FIGS. 20 and 21).

MODIFICATION 2

In the fastener 5 of embodiment 1, the inserting part 6 comprises the enlarged head 7, two tongues 8, the first connecting portion 9, the spherical stop 10, the second connecting portion 11 and the head 12.

Figure 27:
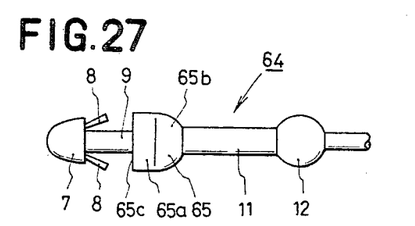
FIG. 27 is a front view of an inserting part having a stop including a vertical face.

In this modification, as shown in FIG. 27, a stop 65 of an inserting part 64 is formed to include a cylindrical portion 65a on the side of the head 7 and a spherical portion 65b contiguous to the rear side of the cylindrical portion 65a. The cylindrical portion 65a has an outer diameter larger than the inner diameter of the guide face of the inner flange of the socket, and the cylindrical portion 65a has a vertical face 65c at the end on the side of the head 7. When the inserting part 64 having this stop 65 is inserted into the aperture of the socket, the vertical face 65c is caused to abut against the abutting face of the inner flange and a good stopping action can be attained.

Figure 28:
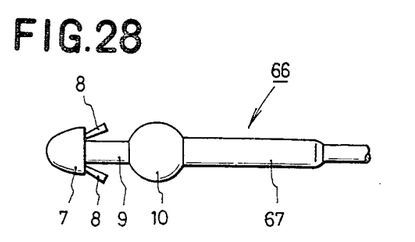
FIG. 28 is a front view of an inserting part having no hold.

Further, formation of the hold 12 on the inserting part 6 in embodiment 1 may be omitted. Namely, as shown in FIG. 28, such hold 12 is not formed on an inserting part 66 but a long second connecting portion 67 is formed.

Figure 29:
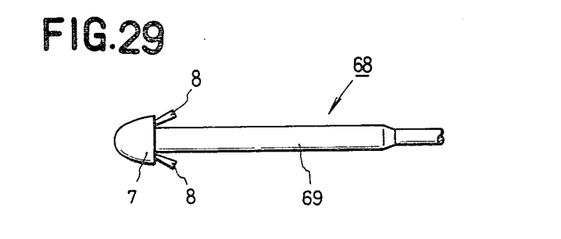
FIG. 29 is a front view of an inserting part having neither a hold nor a stop.

Moreover, as shown in FIG. 29, formation of the stop 10 and hold 12 on the inserting part 6 of embodiment 1 may be omitted. In this case, one long connecting portion 69 is formed on an inserting part 68. The structure of the fastener having such inserting part 68 is very simple, and molding of this fastener is very easy. In the state where the inserting part 68 is anchored to the socket, the long connecting portion 69 inclusive of the filament is readily bent.

Figure 30:
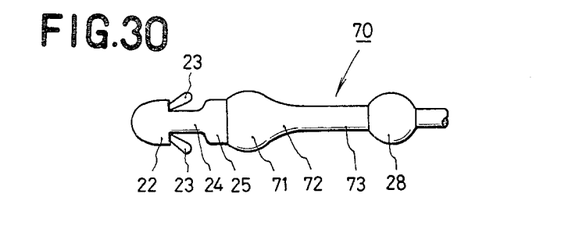
FIG. 30 is a front view of an inserting part having a cylindrical portion in the front of a stop and a portion having a gradually reduced outer diameter in the rear of the stop.

In FIG. 30, the inserting part 21 of embodiment 2 (see FIGS. 9 to 11) is modified. Namely, a taper portion 72 having a gradual inclination is formed on the rear side of a stop 71 of an inserting part 70. In this inserting part 70, this taper portion and a second connecting portion 73 and a hold 28 can be held very easily and the entire appearance of the inserting part 70 is highly improved.

Figure 31:
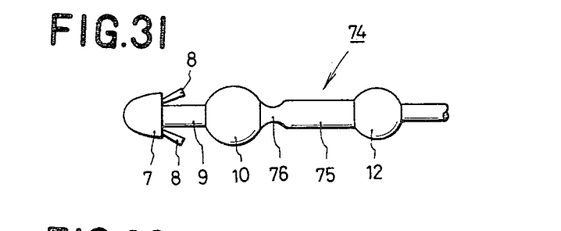
FIG. 31 is a front view of an inserting part having a neck.

In FIG. 31, a neck 76 having a small outer diameter is formed on a second connecting portion 75 of an inserting part 74. Subsequent to insertion of the part 74 into the socket, if it is desired to release the engagement between the part 74 and the socket, this can be easily done by pulling the part 74 only by a relatively small force of pulling and thus breaking the part 74 at the neck portion 76, without any damage to the tongue and so forth. Further, when a bending force is imposed on the inserting part 74 having such neck 76, the bending force is absorbed by the neck 76.

The foregoing modification 2 illustrated in FIGS. 27 to 31 may be applied to any of the inserting parts of embodiments 1 to 5.

MODIFICATION 3

Figure 32:
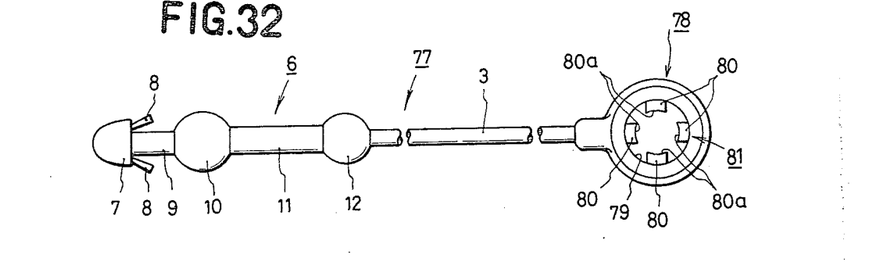
FIG. 32 is a plan view of the fastener and FIG. 33 is a front view of the fastener of FIG. 32 showing the section of a socket.
Figure 33:
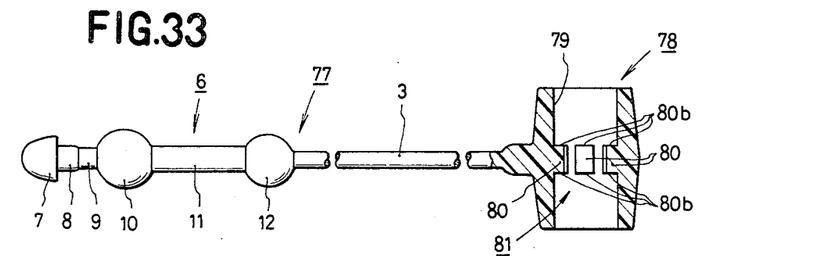

In embodiment 1, the inner flange 15 formed in the aperture 14 of the socket 13 extends along the entire circumference of the aperture 14. In this modification, as shown in FIGS. 32 and 33, an aperture 79 of a socket 78 of a fastenre has an inner flange 81 including 4 independent segments 80. Each segment has a guide face 80a and abutting faces 80b. Four guide faces 80a form one cylindrical face having the same axis as that of the aperture 79, and four corresponding abutting faces 80b form one plane. In this modification, the number of the segments is not critical but optional. The socket 78 of this modification can be molded from a small amount of the material.

This modification is applicable to not only the socket of embodiment 1 but also the sockets of embodiments 2, 3 and 5.

MODIFICATION 4

Figure 34:
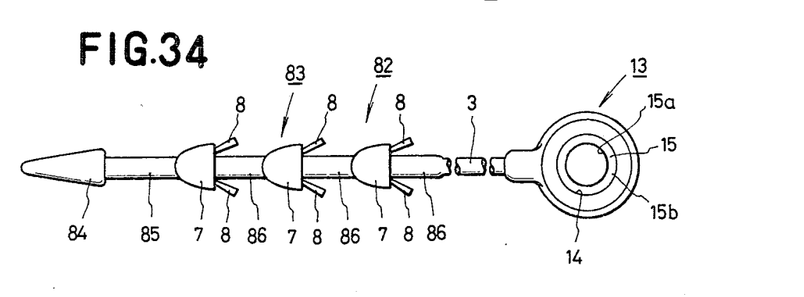
FIG. 34 is a plan view of a fastener according to the fourth modification of the present invention.

In this modification, as shown in FIG. 34, a conical enlarged tip 84 and a first connecting portion 84 are formed on the top end of an inserting part 83 of a fastener 82, and an optional number of units including an enlarged head 7 and two tongues 8 as shown in embodiment 1 are arranged at an appropriate interval subsequently to the first connecting portion 85. These units are connected to one another in a line through second connecting portions 86.

In the fastener 82 of this modification, appropriate tongues 8 selected according to the size of an article are bound to the socket 13, and the enlarged tip 84 projects from the aperture 14 at the time of fastening. A worker can grasp and pull this projecting enlarged tip 84 to tighten the fastener 82.

This modification may be applied to the fasteners of embodiments 1 to 3.

MODIFICATION 5

Figure 35:
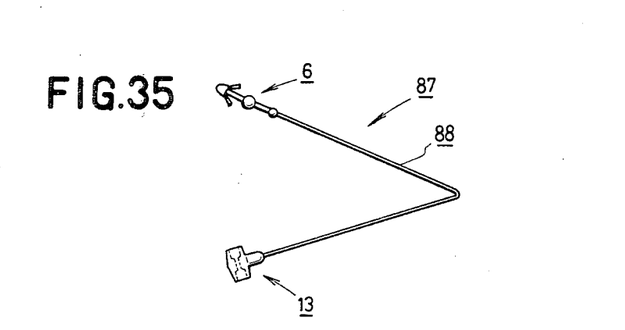
FIG. 35 is a plan view showing the fastener in which a filament is bent in the intermediate portion.

In this modification as shown in FIG. 35, a fastener 87 is molded so that a filament 88 is bent substantially in the central portion. When this fastener 87 is formed in a mold, the distance along which a material such as a plastic material flows in the mold can be reduced to about ½ of the flow distance in case of the fasteners of embodiments 1 to 5. Accordingly, the flow of the material in the mold can be improved and a fastener having high quality can be obtained.

Figures 36, 37, 38:
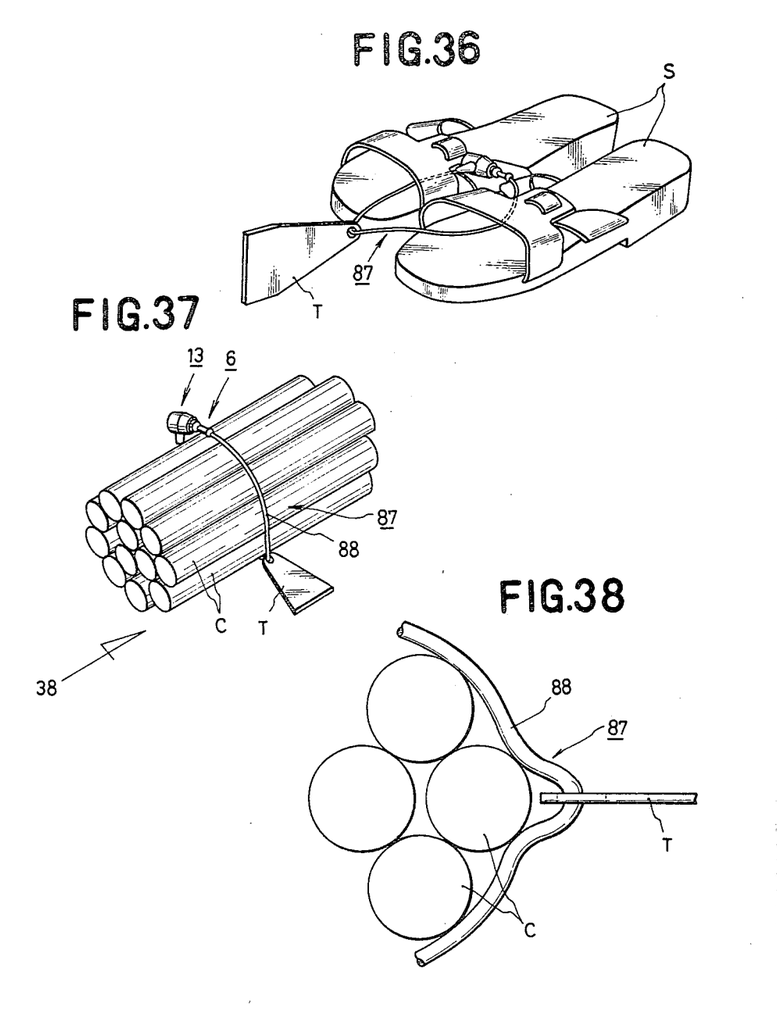
FIG. 36 is a perspective view showing the state where a pair of sandals are bound by the fastener of FIG. 35 and a tag is attached thereto.
FIG. 37 is a perspective view showing the state where a plurality of rod-like articles are bound by the fastener of FIG. 35 and a tag is attached thereto.
FIG. 38 is a view seen from the direction 38 in FIG. 37.

When, for example, a tag is fastened to an article by using the fastener of this modification, the tag is set at the bent portion and it can be held at this position very stably. For example, when a tag T is fastened to a set of sandals S as shown in FIG. 36, the tag T is set at the bent portion so that the tag T can be located at an appropriate position of the sandals S where the tag T can easily been seen by a customer or the like. When rod-like articles C are bound by this fastener 87 as shown in FIG. 37 and a tag is attached to the bent portion, a space for receiving the end portion of the tag T is formed by the bent portion as shown in FIG. 38.

Figure 39:
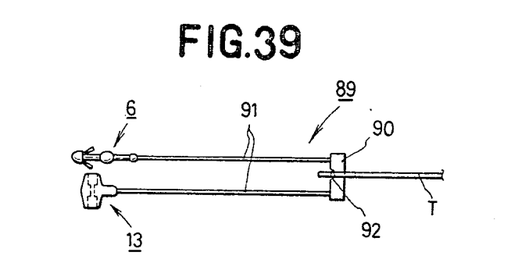
FIG. 39 is a plan view showing the fastener in which a filament is bent through a block and a tag is attached to the block.

In a fastener 89 shown in FIG. 39, a filament 91 is bent in the central portion thereof and a block 90 is formed on the bent portion. A notch 92 is formed on the inside of the central part of the block 90, and a tag T is located at this notch 92.

Figure 40:
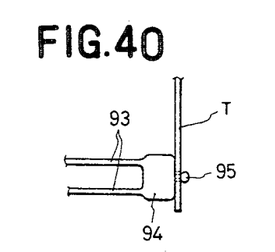
FIG. 40 is a partial plan view of the fastener in which a button is mounted on a block and a tag is attached to the botton.

In a fastener shown in FIG. 40, a filament 93 is bent by a block 94 and a button 95 for attachment of a tag T is formed on the block 94 on the side opposite to the side of the filament 93. When the fastener having such filament 93 and block 94 is used, after fastening of an article by this fastener, the tag T can be attached to the button 95, and it can be freely removed if desired.

Figure 41:
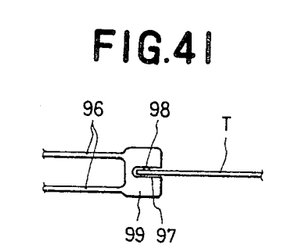
FIG. 41 is a partial plan view of the fastener in which a notch is formed on a block and a tag is attached to the notch.

In a filament 96 shown in FIG. 41, a notch 97 having a projection in the interior thereof is formed on a block 99 on the side opposite to the side of the filament 96. After an article is fastened by the fastener, a tag T can be attached to the interior of the notch 97.

The above-mentioned modification 5 may be applied to the fasteners of embodiments 1 to 5.

MODIFICATION 6

Figure 42:
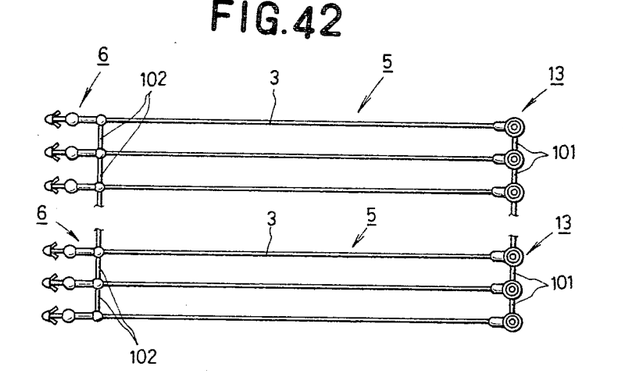
FIG. 42 is a plan view showing a fastener assembly according to the sixth modification of the present invention, which comprises a plurality of fasteners of the first embodiment connected to one another.

As shown in FIG. 42, a plurality of fasteners 5 according to embodiment 1 are arranged in parallel, and sockets 13 of the respective fasteners are connected by a first connecting member 101, and inserting parts 6, for example, holds 12, of the respective fasteners are connected by a second connecting member 102. Thus, a fastener assembly 100 is integrally formed. When the respective fasteners 5 of this assembly 100 are used one by one, the connecting member 101 and 102 may be torn away by hand. The fastener assembly 100 can easily be handled at the manufacturing or packaging step or when the fasteners are actually used.

Such connecting member may be formed for connecting only the sockets 13 of the respective fasteners or for connecting only the inserting parts 6 of the fasteners.

This modification may be applied to the fasteners of embodiments 1 to 6.

Two or more of the foregoing modifications 1 to 6 may be applied in combination. For example, three tongues are formed to the fastener 16 of embodiment 2 according to modification 1, formation of the hold is omitted according to modification 2, the inner flange of the socket is formed of four segments according to modification 4, and a plurality of such fasteners are connected at the sockets through the connecting member according to modification 6, whereby a fastener assembly having characteristics of the respective modifications can be obtained.

What is claimed is:

1. A fastener comprising a socket having an aperture, a filament continuously extended from said socket, and an inserting part provided at the leading end of said filament and capable of being inserted into said aperture in either direction thereof and being anchored in the aperture, wherein a rigid inner flange including a guide face having the same axis as the axis of the aperture and two circular abutting faces perpendicular to said axis, said flange being formed in said aperture, said aperture thereby being symmetrical about a plane perpendicular to the axis of the aperture and wherein at least one elastic tongue is formed on the inserting part, the free end of said tongue expanding outwardly in the radial direction with respect to the axis of said inserting part when it is kept in the free state and said free end of the tongue being contracted inwardly in the radial direction while it is passing through the guide face, and after said free end of the tongue has completely passed through the guide face, it returns to its original free state and is anchored to said abutting faces, whereby said inserting part is tightly connected to the socket.

2. A fastener as set forth in claim 1 which is integrally formed from a synthetic resin by molding.

3. A fastener as set forth in claim 1 wherein the aperture and inner flange formed on the socket are symmetrical with respect to the section passing through the center of the common axis thereof.

4. A fastener as set forth in claim 1 wherein said inserting part has a plurality of tongues.

5. A fastener as set forth in claim 1 wherein said inserting part has a substantially conical elongated head, the maximum diameter of said head is smaller than the inner diameter of the guide face of said inner flange, and the tongue is rooted to the rear vertical face of said head.

6. A fastener as set forth in claim 1 wherein said inserting part has a stop on the rear side of the tongue, the maximum outer diameter of said stop is at least larger than the inner diameter of said guide face, and after the free end of the tongue has passed through the front edge of the guide face, the stop butts against the rear edge of the guide face to prevent deeper insertion of said inserting part, whereby said inserting part is locked in the socket.

7. A fastener as set forth in claim 6 wherein said inserting part has on the front side of said stop a cylindrical portion to be fitted in the guide face of the inner flange when the inserting part is locked in the socket.

8. A fastener as set forth in claim 6 wherein said inserting part has on the front side of said stop a cylindrical portion having an outer diameter larger than the inner diameter of the guide face of the inner flange and the front face of said cylindrical portion is allowed to abut against the front abutting face of said inner flange.

9. A fastener as set forth in claim 6 wherein said inserting part has on the rear side of said stop a hold which a worker can pick up with fingers to insert and lock said inserting part in the socket.

10. A fastener as set forth in claim 9 wherein said inserting part has on the rear side of said stop a taper portion having a gradually decreased outer diameter.

11. A fastener as set forth in claim 9 wherein said inserting part has a neck for absorbing a force imposed on the inserting part, which is formed at a portion connecting said stop to said hold.

12. A fastener as set forth in claim 1 wherein the inner flange formed in the aperture of the socket consists of a plurality of rigid segments, each having a guide face and two abutting faces, the guide faces of the respective segments are on one cylindrical face and the corresponding abutting faces of the respective segments are on one plane.

13. A fastener as set forth in claim 1 wherein the filament is permanently bent at an acute angle substantially in the central portion thereof.

14. A fastener as set forth in claim 13 wherein a block is formed on the bent portion of the filament and said block has a notch formed to pierce through a hold formed on a tag and set said tag at a predetermined position.

15. A fastener as set forth in claim 13 wherein a block is formed on the bent portion of the filament and a button to which a tag is dismoutably attached is formed on said block.

16. A fastener as set forth in claim 13 wherein a block is formed on the bent portion of the filament, a notch to which a tag is dismountably attached is formed on said block, and a projection is formed in said notch.

17. A fastener as set forth in claim 1 wherein on the top end of said inserting part, at least one tongue directly connected to said top end is formed.

18. A fastener comprising a socket having an aperture, a filament continuously extended from said socket, and an inserting part provided at the leading end of said filament and capable of being inserted into said aperture in either direction thereof and being anchored in the aperture, wherein a rigid inner flange including a guide face having the same axis as that of the aperture and two abutting faces perpendicular to said axis is formed in said aperture, an annular projection is formed on each of said two abutting faces in the axial direction thereof so that an annular space is formed and defined by the outer circumference of said projection, said abutting face and a part of the inner circumferential face of said aperture, and wherein at least one elastic tongue is formed on said inserting part, and the free end of said tongue being contained in said annular space when said inserting part is locked in said socket.

19. A fastener as set forth in claim 18 wherein said inserting part comprises, connected in succession, an enlarged head, at least one tongue rooted to the rear end face of said head, a first connecting portion having in part a cylindrical face, a cylindrical portion, a stop having a maximum outer diameter larger than the outer diameter of said cylindrical portion, a second connecting portion and a hold, the cylindrical face of said first connecting portion and said cylindric portion are fitted in said guide face when said inserting part is anchored in the aperture of the socket, and the maximum outer diameter of said head is smaller than the inner diameter of said guide face.

20. A fastener as set forth in claim 18 wherein the thickness of the tongue is gradually increased toward the free end and said free end is rounded.

21. A fastener as set forth in claim 18 wherein the inner diameter of the annular projection formed on the inner flange is gradually decreased toward the top end of said projection.

22. A fastener comprising a socket having an aperture, a filament continuously extended from said socket, and an inserting part provided at the leading end of said filament and capable of being inserted into said aperture in either direction thereof and being anchored in the aperture, wherein a rigid inner flange including a guide face having the same axis as that of the aperture and two circular abutting faces perpendicular to said axis is formed in said aperture, said aperture thereby being symmetrical about a plane perpendicular to the axis of the aperture, and said inserting part comprises an enlarged tip, a first connecting portion and a plurality of units, each unit including an enlarged head, at least one tongue rooted to the rear end face of said head and a second connecting portion.

23. A fastener comprising a socket having an aperture, a filament continuously extended from said socket, and an inserting part provided at the leading end of said filament and capable of being inserted into said aperture in either direction thereof and being anchored therein, wherein a rigid inner flange including a guide face having the same axis as that of the aperture and two circular abutting faces is formed in said aperture, the top end of said inserting part being formed to have a bifurcate shape including at least two elastic prongs, and wherein a fluke having a longitudinal face which is formed on the outside of each of said prongs, and said longitudinal faces of the prongs are caught on the forward abutting face of said aperture when said inserting part is inserted and anchored in said aperture.

24. A fastener as set forth in claim 23 wherein the inner diameter of the aperture is gradually increased from the center toward both the ends.

25. A fastener assembly comprising a plurality of fasteners arranged in parallel, each of said fasteners comprising a socket, a filament continuously extended from said socket, and an inserting part provided at the leading end of said filament; and a first connecting member connecting the sockets of the respective fasteners to one another and/or a second connecting member connecting the inserting parts of the respective fasteners to one another; wherein an aperture is formed in the socket of each fastener, a rigid inner flange having a guide face and two circular abutting faces are formed in said aperture and the inserting part of each fastener has at least one elastic tongue.

26. A fastener assembly as set forth in claim 25 which is integrally formed from a synthetic resin by molding.

* * * * *